Feb. 1, 1955   R. M. P. CONRAD   2,701,196
PHOTOMECHANICAL CORRECTION OF PHOTOGRAPHIC IMAGES
Filed Dec. 3, 1951   2 Sheets-Sheet 1
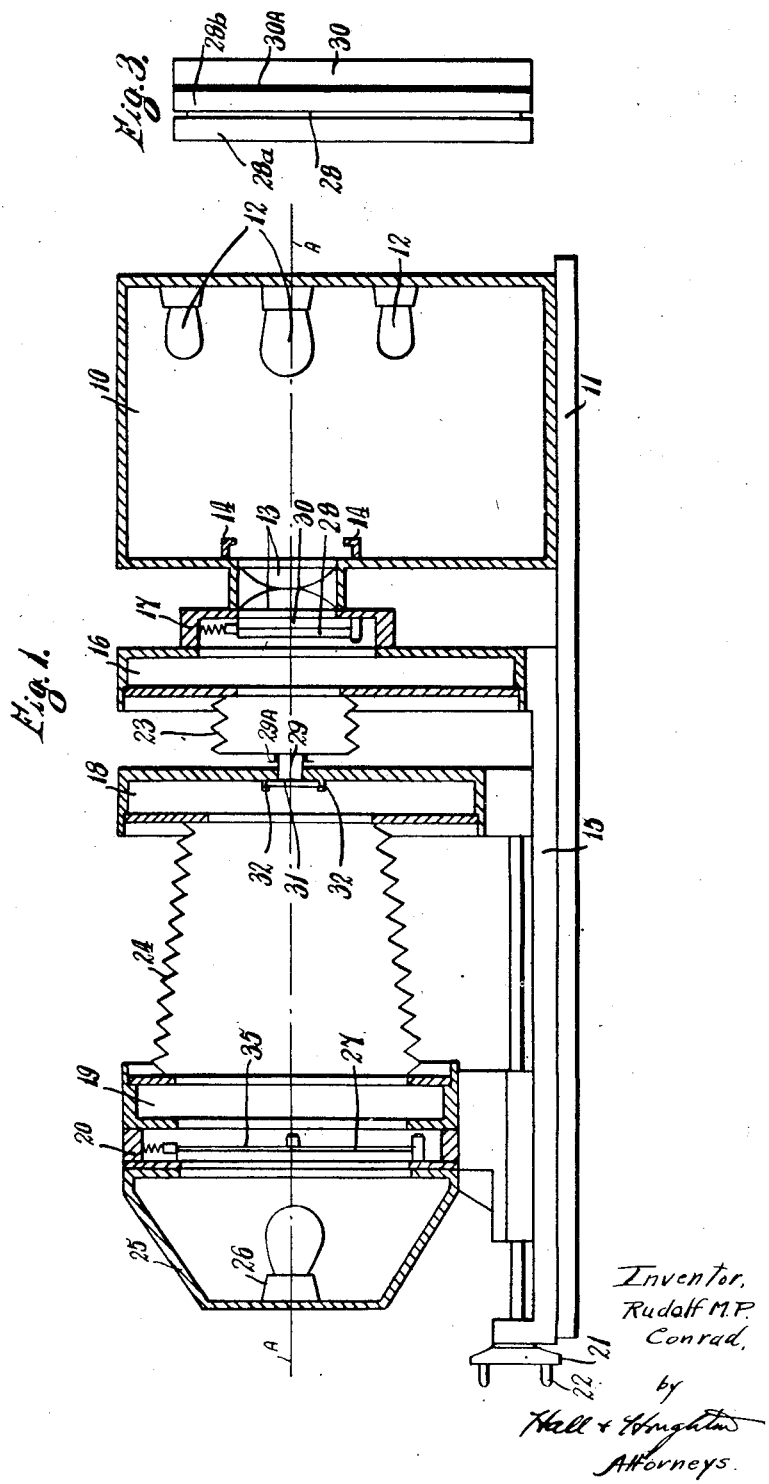
Inventor,
Rudolf M. P. Conrad,
by
Hall & Houghton
Attorneys.

Feb. 1, 1955 R. M. P. CONRAD 2,701,196
PHOTOMECHANICAL CORRECTION OF PHOTOGRAPHIC IMAGES
Filed Dec. 3, 1951 2 Sheets-Sheet 2
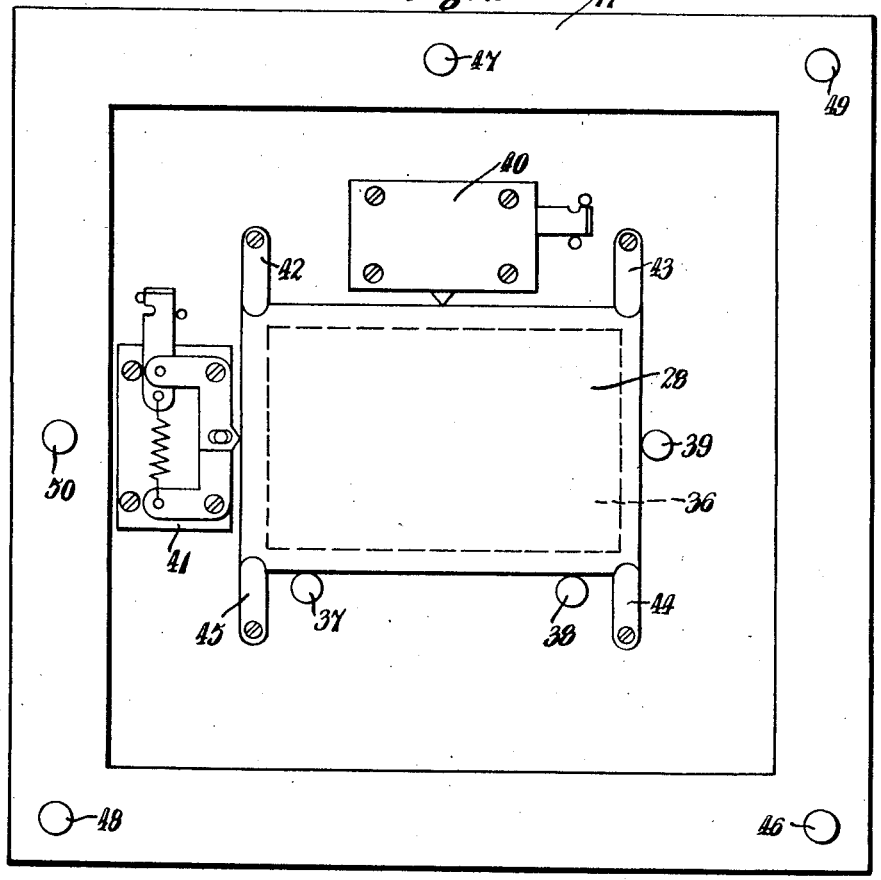
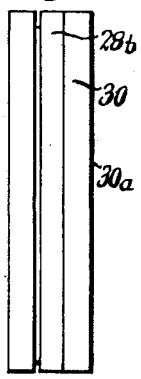 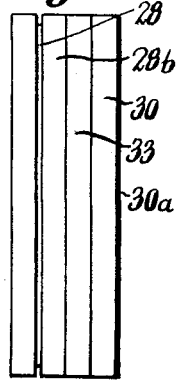 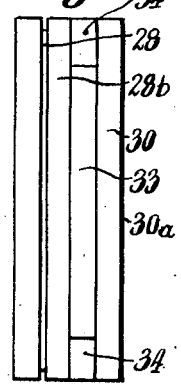 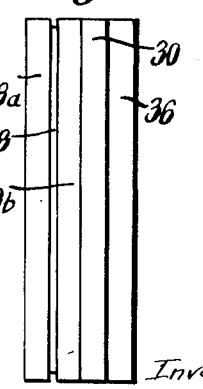
Inventor,
Rudolf M. P. Conrad,
by Hall & Houghton
Attorneys.

United States Patent Office 2,701,196
Patented Feb. 1, 1955

2,701,196

PHOTOMECHANICAL CORRECTION OF PHOTOGRAPHIC IMAGES

Rudolf Michael Peter Conrad, London, England

Application December 3, 1951, Serial No. 259,680

Claims priority, application Great Britain March 8, 1951

15 Claims. (Cl. 95—5)

This invention relates to the photomechanical correction of photographic images and is concerned especially, but not exclusively, with the photomechanical correction of coloured and/or colour-component photographic images.

In the reproduction of photographic images from an original image, which may for example be a photographic transparency, the original image is usually unsuitable for use directly in making the reproductions and steps have to be taken to modify the reproduced images either directly or indirectly, in order to correct for the imperfections which would otherwise occur in the reproduced images. In order to make such corrections it is common practice to use a technique known as masking. For example, when the reproduced images are in black and white, masking may be employed to vary the contrast of the whole image or to suppress unwanted detail in a part of the image. In the case of coloured or colour component reproduced images such masking may also be employed in order to correct for imperfections in the colour filters used and in the colour-sensitivity of the photographic emulsions.

A known method of producing a photomechanical correcting mask for coloured images, and of a type sometimes known as a "soft mask," is as follows:

A plate (or sheet of film) on which the original image is formed is made up into an assembly with an unexposed plate (or sheet of film), the planes of the two plates being parallel. The distance between the planes of the image and the unexposed emulsion is predetermined, additional clear spacing layers, e. g. some clear sheet film, being interposed between the two plates if required. The assembly is mounted on a rotating base, and a light source is so disposed relatively to the base that light rays from the source are incident upon the adjacent surface of the assembly at an angle of about 15° to that surface. The assembly is exposed to the light source whilst the base is rotated, the mask which is obtained being a blurred and slightly distorted reproduction of the original image. The masks produced by this method have only limited application in the photomechanical correction of photographic images and sometimes produce unwanted halo effects.

One object of the present invention is to provide an improved method of producing a mask for use in the photomechanical correction of photographic images.

According to this invention a method of producing a mask for use in the photomechanical correction of an original photographic transparency includes the steps of disposing the transparency in a first plane, projecting into a second plane a focused image, of a predetermined size, of at least a portion of the transparency, disposing a photosensitive surface in a predetermined position on the side of the transparency remote from the second plane, illuminating the said part of the second plane to expose the said photosensitive surface and processing the photosensitive surface to produce a correcting mask.

In applying the invention to the production of photographic images from the said transparency, the processed mask is replaced in the said predetermined position, a photosensitive surface is disposed in the said part of the second plane and light is directed through the mask and the transparency, in the order stated, to expose the last-mentioned photosensitive surface.

According to a subsidiary feature of the invention a printing screen is disposed between the last-mentioned photo-sensitive surface and the transparency and closely adjacent one or the other.

The invention will now be described, by way of example, with reference to the accompanying diagrammatic drawings, wherein:

Fig. 1 is a view in elevation of suitable apparatus for carrying the invention into effect, Fig. 2 is a plan view of a preferred form of photographic plate carrier for use in the apparatus of Fig. 1, the back of the carrier being removed, and Figs. 3 to 7 are views in elevation of details that will be explained in the description.

In practice, the apparatus should be built with the accuracy and freedom from unwanted or uncontrolled movement that is recognised in the art as being necessary. The optical axis of the lens of the apparatus is indicated in Fig. 1 by the line A—A.

A light source for the apparatus comprises a light-tight box 10 mounted on a base 11 and containing electric lamps 12 and a pair of condenser lenses 13. Guides 14 are provided for mounting, if required, a filter for correcting the colour emission characteristic of the lamps 12. A sub-base 15 is mounted on the base 11, a support 16 for a plate-carrier 17 being fixed rigidly to one end of the sub-base 15. A lens support 18 and a support 19 for a plate carrier 20 are mounted for sliding movement in the direction of the axis A—A, such movement of the supports 18 and 19 being produced by rotation of handwheels 21 and 22 respectively. Light-tight bellows 23 and 24 are provided between the supports 16 and 18, 18 and 19 respectively. A second light source comprising a light-tight box 25 containing a lamp 26 can be disposed behind the plate carrier 20, as shown in Fig. 1.

It will be assumed that it is desired to produce three correcting masks each of which is for use with a respective one of three black and white colour component images which are representative of the coloured image of a single colour transparency, the final size of the said colour component images being known. A sheet of ground glass is placed accurately in position at 27 in the plate carrier 20 and the colour transparency, mounted if necessary between two clear glass lantern slides, is placed accurately in position at 28 in the plate carrier 17. The box 10 is moved into the position shown in Fig. 1, the lamps 12 are switched on and the positions of the supports 18 and 19 along the axis A—A are then adjusted, by rotation of the handwheels 21 and 22 respectively, until the image produced by the lens 29 on the adjacent surface of the ground glass screen at 27 is in focus and is of the required size, the ground glass sheet thus serving as a focusing screen.

The lamps 12 are now switched off and a clear spacing layer at 30 is replaced by a photographic plate from which the mask is to be formed. The box 25 is placed in position on the support 19, the ground glass sheet at 27 now serving as a diffusing screen. A filter 31 of the required colour is mounted in guides 32 on the lens support 18 and the photographic plate at 30 is exposed to the light from the lamp 26 through the transparency.

The desired reduction of sharpness which is produced by what will be termed a penumbra effect in the masking image obtained at 30 may be controlled either by (a) adjusting the spacing between the planes of the coloured image of the transparency at 28 and the unexposed emulsion of the plate at 30, or (b) by adjusting the aperture of the lens 29, or (c) by making both of the last-mentioned adjustments.

When making adjustment (a) it may be found that the thickness of the lantern slide 28b (Fig. 3) supporting the transparency at 28 provides sufficient spacing between the said plane of the coloured image and the plane of the emulsion layer 30a of the plate at 30. The said spacing may be made greater, as shown in Fig. 4 by placing the back of the plate at 30 against the lantern slide 28b, or as shown in Figs. 5 and 6, by interposing clear spacing layers such as 33 and 34 respectively between the said plate and lantern slide.

The adjustment (b) is made by varying the size of the aperture in a lens diaphragm, which usually is disposed between the lens components and is built into the lens body. A ring surrounding the body of lens 29 and rotatable for varying the size of the said aperture is indicated in Fig. 1 by 29a. It is a well known characteristic of photographic lenses that as the size of the said aperture is increased the depth of the field of the lens becomes smaller, an image which is disposed outside the said field being more or less out of focus and blurred by the above-mentioned penumbra effect.

The plate at 30 is removed and processed, and is then replaced exactly in its former position in the plate carrier 17. The sheet of ground glass at 27 is replaced by an unexposed photographic plate which is then exposed for the required time to the light of the lamps 12 which passes through the mask and the transparency, the image which is obtained on the plate at 27 being a photomechanically corrected colour component image representative of the coloured image at 28. It will be apparent that provided the plate forming the mask is replaced exactly in the position in the carrier 17 in which it was exposed, no visual registration by an operator of the transparency and the mask is required.

The masks and the corrected colour component images for the other colours are produced by repeating the process described above, each time with a different colour filter at 31. Any of the well known "touching up" processes, such as local or overall intensification or reduction, can be applied to each mask before the respective plate is replaced in the carrier 17.

Corrected, screened, colour component photographic images suitable for the production, without further correction, of blocks for use in colour printing can be produced directly with this method by placing a printing screen 35 at a predetermined distance (which generally will be comparatively small) or in contact with each of the plates at 27, the pattern of the screen thus being incorporated in the said colour component images. The printing screen can, of course, be placed in contact with the transparency at 28, but this is not usual practice.

If a corrected coloured image is to be produced directly at 27 from the coloured image of a colour transparency at 28 then a colour filter may not be required at 31. However, some types of correction may require the use of a suitable filter at 31 whilst and mask and/or the said corrected coloured image are produced.

In some cases it may be desired, for example, both to correct the contrast of the whole of an image and to subdue a high-light in only a part of the image. It is usually not convenient, or may even be impossible, to produce the required corrections by a single mask and two or more separate masks may be used. Each mask is produced separately, its position relatively to the transparency whilst it is being produced being the same as the position it occupies when all the masks and the transparency are assembled together for the production of the corrected image. Thus, referring to Fig. 7, for example, a first mask is produced on the plate 30, which is then removed and replaced by a clear spacing layer of the same thickness whilst a second mask is produced on the plate 36. It will be apparent that the plate 30 can be removed and processed and can then be replaced whilst the said second mask is produced. It will also be apparent that, normally, the mask which is to be least sharp will be disposed at the greatest distance from the transparency at 28.

Methods of controlling the sharpness of the masks have been described above. The density of the mask can, of course, be controlled by such factors as the exposure time, the sensitivity of the photographic emulsion, etc. If the transparency at 28 is a negative image then the masks produced as described above will be positive masks (unless reversal stock is used) and vice versa. However, in some cases it may be desired to use a negative mask or a combination of negative and positive masks. The negative masks may be produced by first producing a positive mask and then producing the negative mask by contact printing from the positive mask. Preferably, the contact printing is done using the slide carrier 17 as a printing frame, since registration of the transparency image and the associated mask or masks can then be achieved more readily. Alternatively the negative mask or masks may be produced directly by using reversal stock.

If the image to be corrected is an original photograph on substantially opaque stock, e. g. a normal positive on paper, an uncorrected transparency, such as a transparent negative or positive (or a group of uncorrected colour component transparent negatives or positives), are first produced in well known manner using reflected light. The uncorrected transparency is then placed at 28 and the required mask or masks, and the final corrected image or images, are produced as described above.

In all the methods described above it has been assumed that the associated mask (or masks) and/or colour filter is present for the whole of the period that the photosensitive surface is exposed. However, this is not necessarily the case and in some applications the mask (or masks) and/or the colour filter (or filters) is only present for part of the said exposure period.

It will have been noted that it is often necessary to insert a photosensitive plate in its plate carrier, to mount the plate carrier on its respective support, to expose the plate, to remove the plate carrier with the exposed plate from the support, to remove the plate from the carrier and process it and subsequently to restore the plate to the carrier and replace the carrier on the support in such a way that the plate is located in exactly the same position as before. This is especially true of the plate carrier 17 and the plates at 28, 30 and 35. Referring now to Fig. 2, in a preferred form of plate carrier, the plate 28 is arranged over a window 36 in the carrier and is located exactly relatively to the carrier by lays or abutments 37, 38 and 39, which are in the form of pins of circular cross-section. Two of the lays 37 and 38 locate one edge of the plate and the lay 39 locates an edge at right angles to the first mentioned edge. The plate 28 is pressed against the lays in two mutually perpendicular directions by spring devices 40 and 41. Spring clips 42 to 45 are provided to press the plate 28 against the wall in which the window 36 is formed. The carrier 17 is itself located accurately relatively to the support 18 by means of studs 46, 47 and 48, for use when the plate is desired to be disposed with its longer dimension horizontal, and by means of studs 46, 49 and 50, for use when the plate is to be disposed with its longer dimension vertical. Each stud may engage in an aperture in the support. Alternatively the studs may be provided upon the support and the recesses in the plate carrier. This plate carrier is the subject of co-pending patent application Serial No. 249,056 filed October 1, 1951.

For convenience, in this specification reference is made only to a printing screen. However, it is to be understood that this term is not intended to be limited in scope to any particular form of screen but, on the contrary, is intended to cover all forms of screens which can be used for dividing the corrected images obtained into a number of discrete areas e. g. half-tone screens, photogravure screens.

I claim:

1. A method of producing a corrected photographic record from a photographic transparency, including the steps of disposing the transparency in a first plane, projecting into a part of a second plane, with the aid of a lens, a focused image of at least a portion of the transparency, disposing a photosensitive surface in a position spaced from the transparency on the side of the transparency remote from the sceond plane, illuminating the said part of the second plane to expose the said photosensitive surface to light projected therefrom through the lends and transparency, processing the photosensitive surface to produce a correcting mask, placing the mask in the aforesaid position, disposing a photosensitive recording surface in the said part of the second plane, directing light through the mask and the transparency, in the order stated, to project onto said recording surface with the aid of said lens, a focused image of the transparency illuminated through said mask, and exposing said recording surface to the so illuminated image.

2. A method of producing a screened, corrected photographic record from a photographic transparency, including the steps of disposing the transparency in a first plane, projecting into a part of a second plane, with the aid of a lens, a focused image of at least a portion of the transparency, disposing a photosensitive surface in a position spaced from the transparency on the side of the transparency remote from the second plane, illuminating the said part of the second plane to expose the said photosensitive surface to light projected therefrom through the lens and transparency, processing the photosensitive surface to produce a correcting mask, placing the mask in the aforesaid position, disposing a photosensitive recording surface in the said part of the second plane, disposing a printing screen between the transparency and the photosensitive recording surface and closely adjacent the latter, directing light through the mask, the transparency, in the order stated, to project onto said recording surface, with the aid of said lens and screen, a focused screened image of the transparency illuminated through said mask, and exposing said recording surface to the so illuminated screened image.

3. A method of producing a screened, corrected photographic record from a photographic transparency, including the steps of disposing the transparency in a first plane, projecting into a part of a second plane, with the aid of a lens, a focused image of at least a portion of the transparency, disposing a photosensitive surface in a position spaced from the transparency on the side of the transparency remote from the second plane, illuminating the said part of the second plane to expose the said photosensitive surface to light projected therefrom through the lens and transparency, processing the photosensitive surface to produce a correcting mask, placing the mask in the aforesaid position, disposing a photosensitive recording surface in the said part of the second plane, disposing a printing screen between the photosensitive recording surface and the transparency and closely adjacent the latter, directing light through the mask, the transparency, in the order stated, to project onto said recording surface, with the aid of said lens and screen, a focused screened image of the transparency illuminated through said mask, and exposing said recording surface to the so illuminated screened image.

4. A method of producing a corrected colour component photographic record from a photographic colour transparency, including the steps of disposing the transparency in a first plane, projecting into a part of a second plane, with the aid of a lens, a focused image of at least a portion of the colour transparency, disposing a photosensitive surface in a position spaced from the transparency on the side of the transparency remote from the second plane, disposing a colour filter of the required colour between the said part of the second plane and the photosensitive surface, illuminating the said part of the second plane to expose the said photosensitive surface to light projected therefrom through the colour filter and lens and the transparency, processing the photosensitive surface to produce a correcting mask, placing the mask in the aforesaid position, disposing a photosensitive recording surface in the said part of the second plane, directing light through the mask and the transparency, in the order stated, to project onto said recording surface, with the aid of said lens and filter, a focused filtered image of the transparency illuminated through said mask, and exposing said recording surface to the so illuminated filtered image.

5. A method of producing a screened, corrected colour component photographic record from a photographic colour transparency, including the steps of disposing the transparency in a first plane, projecting into a part of a second plane, with the aid of a lens, a focused image of at least a portion of the colour transparency, disposing a photosensitive surface in a position spaced from the transparency on the side of the transparency remote from the second plane, disposing a colour filter of the required colour between the said part of the second plane and the photosensitive surface, illuminating the said part of the second plane to expose the said photosensitive surface to light projected therefrom through the colour filter and lens and the transparency, processing the photosensitive surface to produce a correcting mark, placing the mask in the aforesaid position, disposing a photosensitive recording surface in the said part of the second plane, disposing a printing screen between the colour transparency and the photosensitive recording surface and closely adjacent the latter and directing light through the mask and the colour transparency, in the order stated, to project onto said recording surface, with the aid of said lens, screen and filter, a focused screened and filtered image of the transparency illuminated through said mask, and exposing said recording surface to the so-illuminated screened and filtered image.

6. A method of producing a screened, corrected colour component photographic record from a photographic colour transparency, including the steps of disposing the transparency in a first plane, projecting into a part of a second plane, with the aid of a lens, a focused image of at least a portion of the colour transparency, disposing a photosensitive surface in a position spaced from the transparency on the side of the transparency remote from the second plane, disposing a colour filter of the required colour between the said part of the second plane and the photosensitive surface, illuminating the said part of the second plane to expose the said photosensitive surface to light projected therefrom through the colour filter and lens and the transparency, processing the photosensitive surface to produce a correcting mask, placing the mask in the aforesaid position, disposing a photosensitive recording surface in the said part of the second plane, disposing a printing screen between the photosensitive recording surface and the colour transparency and closely adjacent the latter and directing light through the mask and the colour transparency, in the order stated, to project onto said recording surface, with the aid of said lens, screen and filter, a focused screened and filtered image of the transparency illuminated through said mask, and exposing said recording surface to the so-illuminated screened and filtered image.

7. A method of producing a corrected photographic record from a photographic transparency, including the steps of disposing the transparency in a first plane, projecting into a part of a second plane by means of a lens a focused image of a predetermined size of at least a portion of the transparency, disposing a photosensitive surface in a predetermined position spaced from the transparency on the side of the transparency remote from the second plane, adjusting the size of the aperture in a diaphragm of the said lens to introduce a penumbra effect into an image produced by the lens in the plane of the last-mentioned photosensitive surface, illuminating the said part of the second plane to expose the said photosensitive surface to light directed through the transparency by the lens, processing the photosensitive surface to produce a correcting mask, replacing the processed mask in the said predetermined position, disposing a photosensitive surface in the said part of the second plane, producing the said focused image of the said predetermined size on the last-mentioned photosensitive surface and directing light through the mask, the transparency and the lens, in the order stated, to expose the last-mentioned photosensitive surface.

8. A method of producing a corrected photographic record from a photographic transparency, including the steps of disposing the transparency in a first plane, projecting into a part of a second plane, with the aid of a lens, a focused image of a predetermined size of at least a portion of the transparency, disposing a first photosensitive surface in a first position spaced from the transparency on the side of the transparency remote from the second plane, illuminating the said part of the second plane to expose the first photosensitive surface to light projected therefrom through the lens and transparency, disposing a second photosensitive surface in a second position which is spaced from said first position and is on the side of the transparency remote from the second plane, illuminating the said part of the second plane to expose the second photosensitive surface to light projected therefrom through the lens and transparency, processing the first and second photosensitive surfaces to produce first and second correcting masks respectively, placing the said first and second masks respectively in said first and second positions, disposing a photosensitive surface in the said part of the second plane, and directing light through the masks onto the transparency to project onto said recording surface, with the aid of said lens, a focused image of the transparency illuminated through said masks, and exposing said recording surface to the so illuminated image.

9. A method of producing a corrected photographic record from a photographic transparency, including the steps of disposing the transparency in a first plane, projecting into a part of a second plane a focused image of at least a portion of the transparency, disposing a first photosensitive surface in a first position spaced from the transparency on the side of the transparency remote from the second plane, illuminating the said part of the second plane to expose the first photosensitive surface to light projected therefrom through the lens and transparency, processing the first photosensitive surface to produce a first correcting mask, placing the first mask in said first position, disposing a second photosensitive surface in a second position on the side of the first correcting mask remote from the transparency, illuminating the said part of the second plane to expose the second photosensitive surface to light projected therefrom through the lens and transparency and the first mask, in the order stated, processing the second photosensitive surface to produce a second correcting mask, placing the second mask in said second position, disposing a photosensitive surface in the said part of the second plane, and directing light through the second mask, the first mask and the transparency, in the order stated, to project onto said recording surface, with the aid of said lens, a focused image of the transparency illuminated through said masks, and exposing said recording surface to the so illuminated image.

10. The method of producing a corrected photographic record from a photographic transparency that consists in (1) determining the final image size at the outset by (a) mounting the transparency in a first plane, (b) illuminating the same, (c) projecting an image thereof to a viewing screen in a second plane with the aid of a lens system, and (d) bringing said image into focus on said viewing screen; (2) making a mask from the transparency by (a) illuminating the viewing screen, (b) back projecting light therefrom through the focused lens system and the transparency to a sensitized plate positioned in a third plane spaced from the first plane at the side thereof remote from the second plane and (c) removing and processing the sensitized surface to form a mask; (3) placing the mask in the position in which it was exposed and making the corrected record of the transparency by (a) illuminating the transparency through the mask to correct the image of the transparency projected to said second plane, (b) exposing a sensitized recording surface to such corrected image at said second plane and (c) removing and processing said exposed recording surface.

11. The method of producing a corrected photographic record from a photographic transparency with the aid of a lens system having conjugate focal planes, which method includes the steps of placing the transparency at one of the conjugate focal planes of the lens system, placing a photosensitive surface in a selected position spaced from the transparency at the side thereof remote from the other conjugate focal plane, and exposing said photo-sensitive surface by illuminating said other focal plane to pass light through the lens system and project an image of the transparency thereto, removing the so exposed surface and processing the same to form a mask and replacing the mask in said selected position, placing a photosensitive recording surface in said other conjugate plane, and exposing said recording surface by illuminating said transparency through said mask to project the mask corrected image of the transparency to the recording surface through the lens system.

12. The method of producing a corrected photographic record from a photographic transparency, which method includes the steps of placing the transparency at one of the conjugate focal planes of a lens system and projecting light therethrough by illuminating the other of said conjugate planes; exposing a photosensitive surface at a selected position spaced from the transparency in the path of the projected light that has passed through the transparency; removing the so exposed surface and processing the same to form a mask; replacing the resulting mask in the same selected position; directing light through the mask and transparency in that order to produce a corrected focused image of the transparency at said other conjugate plane, and exposing a photosensitive recording surface to the corrected focused image in said other conjugate plane.

13. The method of producing a corrected color component photographic record from a photographic color transparency, which method includes the steps of placing the transparency at one of the conjugate focal planes of a lens system and projecting light therethrough by illuminating the other of said conjugate planes while color filtering said light between said conjugate planes; exposing a photosensitive surface at a selected position in the path of the projected filtered light that has passed through the transparency; removing the so exposed surface and processing the same to form a mask; replacing the resulting mask in the same selected position; directing light through the mask and transparency in that order to produce a corrected focused image of the transparency at said other conjugate plane while color filtering said light between said conjugate planes, and exposing a photosensitive recording surface to the corrected focused image in said other conjugate plane.

14. A method of producing a corrected photographic record from a photographic transparency, including the steps of disposing the transparency in a first plane, projecting into a part of a second plane, with the aid of a lens, a focused image of at least a portion of the transparency, disposing a first photosensitive surface in a first position spaced from the transparency on the side of the transparency remote from the second plane, illuminating the said part of the second plane to expose the first photosensitive surface to light directed through the transparency by the lens, disposing a second photosensitive surface in a second position spaced from said first position on the side of the transparency remote from the second plane, illuminating the said part of the second plane to expose the second photosensitive surface to light directed therefrom through the transparency, processing the first and second photosensitive surfaces to produce first and second correcting masks respectively, placing the said first and second masks in said first and second positions respectively, disposing a photosensitive surface in the said part of the second plane, directing light through the masks on to the transparency to illuminate the transparency and with the aid of said lens, form in the said part of the second plane, a focused image of the illuminated transparency to expose the last mentioned photosensitive surface.

15. A method of producing a corrected photographic record from a photographic transparency, including the steps of disposing the transparency in a first plane, projecting into a part of a second plane, with the aid of a lens, a focused image of at least a portion of the transparency, disposing a first photosensitive surface in a first position spaced from the transparency on the side of the transparency remote from the second plane, illuminating the said part of the second plane to expose the first photosensitive surface to light directed through the transparency, processing the first photosensitive surface to produce a first correcting mask, placing the first mask in the said first position, disposing a second photosensitive surface in a second position spaced from said first position in a direction proceeding away from the transparency, illuminating the said part of the second plane to expose the second photosensitive surface to light directed through the transparency and the first mask, in the order stated, processing the second photosensitive surface to produce a second correcting mask, placing the second mask in said second position, disposing a photosensitive surface in the said part of the second plane, and directing light through the second mask and the first mask, in the order stated, to illuminate the transparency, and, with the aid of said lens, forming a focused image of said illuminated transparency in said part of the second plane to expose the last-mentioned photosensitive surface.

References Cited in the file of this patent

UNITED STATES PATENTS

| | | |
|---|---|---|
| 691,535 | Ehlerman | Jan. 21, 1902 |
| 1,563,499 | Knudsen | Dec. 1, 1925 |
| 2,420,636 | Yule | May 13, 1947 |